United States Patent Office 3,378,438
Patented Apr. 16, 1968

3,378,438
COMPOSITIONS AND METHODS FOR
CONTROLLING FUNGI
Karl Gätzi, Basel, Switzerland, assignor to J. R. Geigy
A.G., Basel, Switzerland
No Drawing. Continuation-in-part of application Ser. No.
290,208, June 25, 1963. This application June 25, 1963,
Ser. No. 290,343
Claims priority, application Switzerland, July 10, 1962,
8,320/62
9 Claims. (Cl. 167—33)

This application is a continuation-in-part of application Ser. No. 290,308, filed June 25, 1963, now U.S. Patent 3,255,181, issued June 7, 1966.

This invention relates to a novel method of controlling the growth of fungi by applying to the fungi or the substrate on which they grow, certain heterocyclic amines possessing fungicidal activity, or compositions containing these amines as active ingredients. The invention also relates to the said compositions.

It has been found that certain heterocyclic amines falling under the general Formula I

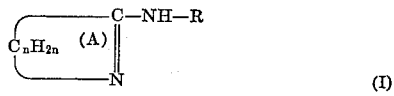

(I)

wherein R represents an alkyl with from 8 to 15 carbon atoms which is unsubstituted or substituted, or a cycloalkyl, an aryl or an aralkyl radical which is unsubstituted or substituted, an alkylamino, benzylamino or polyalkylenoxy radical or the group $-(CH_2)_y-NH-R_1$ wherein $R_1$ is hydrogen, an alkyl, cycloalkyl, aryl, or aralkyl radical which is unsubstituted or substituted, or a heterocyclic radical, all radicals being defined more specifically below, and wherein $y$ represents a whole number of 2 to 6, and $n$ represents a whole number from 3 to 15,
from 3 to not more than 7 of the carbon atoms of $C_nH_{2n}$ being ring members of ring A,
their salts, with inorganic and organic acid as well as their quaternary salts, have excellent fungicidal properties.

Compounds of the general Formula I are obtained by reacting equivalent amounts of a lactim ether of the formula

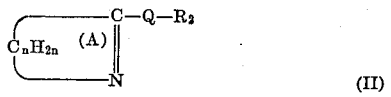

(II)

wherein $R_2$ represents a lower alkyl radical having 1 to 3 carbon atoms,
Q represents oxygen or sulfur, and
$n$ has the above given meaning, preferably in the presence of an organic solvent and of a tertiary amine as catalyst, with a primary amine of the general formula $$NH_2-R \quad \text{(III)}$$

wherein R has the meaning given above. As organic solvents, e.g., aromatic hydrocarbons, alcohols, esters, ketones, ethers etc. are used.

Examples of tertiary amines are pyridine, trimethylamine, triethylamine, triethanolamine etc. In the reaction, the radical $-QR_2$ is split off and an alcohol or mercaptan is formed. By the term "salts" are meant salts of inorganic and organic acids as well as the quaternary salts. The salts of inorganic and organic acids with compounds of the general Formula I are obtained by reacting optionally in the presence of neutral organic solvents or of water, the reaction products obtained by the process described, with equivalent amounts of an inorganic or organic acid such as hydrochloric acid, sulfuric acid, phosphoric acid, formic acid, acetic acid, propionic acid, sorbic acid, oxalic acid, succinic acid, phthalic acid, p-toluene sulfonic acid, and others.

The quaternary salts are obtained by reacting equivalent amounts of compounds of the general formula I with conventional quaternising agents, e.g., reactive esters of sulfuric acid and toluene sulfonic acid, or reactive derivatives of alcohols, e.g., methyl iodide, butyl bromide or benzyl chloride. This reaction may be performed in the presence of an organic inert solvent e.g., benzene, or of water.

By the symbol $-C_nH_{2n}-$ in the Formulas I and II are meant alkylene radicals with from 3 to 15 carbon atoms which may be substituted by branched or straight chain alkyl radicals, but of which from 3 to not more than 7 carbon atoms are ring members of ring A.

More specifically, R in Formula I represents alkyl with from 8 to 15 carbon atoms, bromoalkyl with from 4 to 15 carbon atoms, chloroalkyl with from 4 to 15 carbon atoms, alkylamino with from 1 to 15 carbon atoms, alkoxy-alkyl having a total of from 4 to 20 carbon atoms, alkylthio-alkyl having a total of from 4 to 20 carbon atoms, alkoxy-alkoxy-alkyl with from 5 to 15 carbon atoms, and alkoxy-alkoxy-alkoxy-alkyl with from 7 to 15 carbon atoms, all alkyl and alkoxy portions of the four last-mentioned radicals except the terminal alkoxy or alkylthio portion having at least 2 carbon atoms.

Moreover, R in Formula I represents a radical of the formula $$-(CH_2)_y-NH-R_1$$

wherein $R_1$ is hydrogen, alkyl with from 1 to 15 carbon atoms, alkoxy-alkyl with from 3 to 15 carbon atoms, alkylthio-alkyl with from 3 to 15 carbon atoms, chloroalkyl with from 2 to 15 carbon atoms, bromo-alkyl with from 2 to 15 carbon atoms, phenyl, lower alkyl-phenyl, lower alkoxy-phenyl, chloro-phenyl, bromo-phenyl, phenyl-lower alkyl, lower alkyl-phenyl-lower alkyl, lower alkoxy-phenyl-lower alkyl, chlorophenyl-lower alkyl, bromophenyl-lower alkyl, cycloalkyl with from 5 to 7 carbon atoms, and lower alkyl-cycloalkyl with from 5 to 7 ring carbon atoms.

"Lower" when used in connection with alkyl or alkoxy means a radical with from 1 to 4 carbon atoms.

Furthermore, R in Formula I represents phenyl, lower alkyl-phenyl, lower alkoxy-phenyl, chloro-phenyl, bromo-phenyl, phenyl-lower alkyl, lower alkyl-phenyl-lower alkyl, lower alkoxy-phenyl-lower alkyl, chlorophenyl-lower alkyl, bromophenyl-lower alkyl, cycloalkyl with from 5 to 7 carbon atoms, lower alkyl-cycloalkyl with from 5 to 7 ring carbon atoms, benzylamino, and $R_1$ represents further $\Delta^{1,5}$-azacyclopentenyl-(5), lower alkyl-$\Delta^{1,5}$ - azacyclopentenyl - (5), $\Delta^{1,7}$-azacycloheptenyl-(7), lower alkyl-$\Delta^{1,7}$-azacycloheptenyl-(7), $\Delta^{1,9}$-azacyclononenyl-(9) and lower alkyl-$\Delta^{1,9}$-azacyclononenyl-(9).

Examples of compounds of the general Formula II are the O-methyl, O-ethyl, O-propyl lactim ethers, the methyl ethers of the 4-tert. butyl, 4-amyl, 4-tert. butyl-6-methyl and 4,6-diisopropyl caprolactim, as well as the corresponding thioethers of the lictim forms of α-pyrrolidone, α-piperidone, caprolactam, enanthlactam and capryl lactam.

The following are employed as amines of Formula III: octylamine, decylamine, undecylamine, laurylamine, tetra or pentadecylamine, polychlorooctylamine, polychlorolaurylamine, benzylamine, β-phenylethylamine, γ-phenylpropylamine, α-methylbenzylamine, α-isobutylbenzylamine, α-cyclohexylbenzylamine, myristylamine, γ-methoxypropylamine, γ - ethoxypropylamine, γ - (polyethoxy)-propylamine, ethylenediamine, 1,3-diaminopropane, 1,6 - diaminohexane, 1,2-diaminocyclohexane, N-hexyl-1,2-diaminoethane, N-octyl-1,2-diaminoethane, N-dodecyl-1,2-diaminoethane, N-octyl-1,3-diaminopropane, hexyl-1,2-diaminocyclohexane, N-phenyl-1,3-diaminopropane, N-o-, N-m-, N-p-chlorophenyl-1,3-diaminopropane, and others.

The compounds of Formula I or their salts are suitable in particular as active substances for fungicidal agents. Due to their slight toxicity to warm blooded animals and the absence of phytotoxicity in the concentrations applied in practice, which vary between 0.1 to 2% calculated on the active substance, the compounds of Formula I are particularly suitable for plant protection. The use of the active substances as fungicides in orchards is of particular importance. In addition the active substances according to the invention can be used as dry seed dressing agents as they have an excellent action, e.g., on Tilletia tritici, Fusarium culmorum etc. and they do not inhibit germination.

The following examples describe the production of the active substances according to the invention. Parts are given therein as parts by weight unless stated otherwise and the temperatures are in degrees centigrade.

EXAMPLE 1

12.7 parts of O-methyl caprolactim,[1] 18.5 parts of n-dodecylamine, 200 parts by volume of ethanol and 1.0 part of triethylamine are refluxed for 20 hours. The main amount of the ethanol is then evaporated off in vacuo and the residue is taken up in ether and washed with water. On evaporating the ether solution, the 7-dodecylamino-3,4,5,6-tetrahydro-2H-azepine obtained is recrystallized from petroleum ether.

On dissolving in the equivalent amount of dilute hydro-

[1] O-methyl caprolactim produced as described in Organic Synthesis 31, 72 (1951).

chloric acid, the hydrochloride is obtained (re-crystallized from water or acetone).

In an analogous manner, there are produced from 7-dodecylamino-3,4,5,6-tetrahydro-2H-azepine and the corresponding dilute acid the sulfate, nitrate, phosphate, formiate, acetate, propionate, sorbate, oxalate, succinate, fumarate, phthalate, p-toluenesulfonate and benzoate of 7-dodecylamino-3,4,5,6-tetrahydro-2H-azepine.

EXAMPLE 2

14.3 parts of 2-methylthio-3,4,5,6-tetrahydro-2H-azepine, 200 parts by volume of benzene, 18.6 parts of laurylamine and 1 part of triethylamine are refluxed for 20 hours. The solution is concentrated in vacuo and the residue is recrystallised from petroleum ether; the 7-laurylamino-3,4,5,6-tetrahydro-2H-azepine is then converted to the hydrochloride according to Example 1.

7 parts of 7-laurylamino-3,4,5,6-tetrahydro-2H-azepine are dissolved in 100 parts by volume of anhydrous benzene, and 3.25 parts of dimethylsulfate are added drop by drop and the resulting mixture is then refluxed for one hour. On evaporating the benzene the quaternary 7-laurylamino-3,4,5,6-tetrahydro - 2H - azepine dimethylsulfate is obtained as water-soluble viscous oil which decomposes upon distillation.

Further compounds of Formula I of which the data for $n$, $z$ which represents the number of carbon atoms being ring members in ring A besides the —C=N— groupings, the alkyl branching at ring A, if present, as well as R, are given in the Table I below, and salts and quaternary salts of these compounds, of which the anion or quaternizing agent is also given below, are produced in the manner described in Examples 1 and 2 from equivalent amounts of the corresponding lactim ether of Formula II and the corresponding amine of Formula III.

The starting materials are either known or have been produced in a manner analogous to that of making the known starting materials.

TABLE I

| Example No. | n | z | Alkyl branching | R | Salt |
|---|---|---|---|---|---|
| 3 | 3 | 3 | | n-Octyl | |
| 4 | 3 | 3 | | n-Dodecyl | |
| 5 | 5 | 3 | 3-ethyl | n-Decyl | |
| 6 | 5 | 3 | do | 8'-methyl-nonyl | |
| 7 | 5 | 5 | | n-Octyl | |
| 8 | 5 | 5 | | do | Chloride. |
| 9 | 5 | 5 | | n-Tetradecyl | |
| 10 | 5 | 5 | | n-Hexylamino | |
| 11 | 5 | 5 | | n-Butylamino | |
| 12 | 5 | 5 | | n-Octylamino | |
| 13 | 5 | 5 | | n-Decylamino | |
| 14 | 5 | 5 | | n-dodecylamino | |
| 15 | 5 | 5 | | $C_2H_5$-O-$CH_2$-$CH_2$-O-$CH_2$-$CH_2$-O-$C_3H_6$ | |
| 16 | 5 | 5 | | 8'-chloro-octyl | |
| 17 | 5 | 5 | | 6'-methoxy-n-hexyl | |
| 18 | 5 | 5 | | 6'-(n-propylthio)-n-hexyl | |
| 19 | 5 | 5 | | 11'-bromo-undecyl | |
| 20 | 5 | 5 | | 5'-bromo-pentyl | |
| 21 | 5 | 5 | | Mixture of perchloroocytl radicals of the average formula $C_8H_{12.5}Cl_{4.5}$ | |
| 22 | 7 | 5 | 4-ethyl | n-Butyl | |
| 23 | 7 | 5 | do | n-Pentyl | Oxalate. |
| 24 | 7 | 5 | do | 2',2',2'-trimethyl-ethyl | |
| 25 | 9 | 5 | 4-t-butyl | n-Octyl | |
| 26 | 9 | 5 | do | n-Decyl | |
| 27 | 9 | 5 | do | n-Dodecyl | |
| 28 | 9 | 5 | do | n-Tetradecyl | |
| 29 | 10 | 5 | 4-amyl | n-Octyl | |
| 30 | 10 | 5 | 4-isoamyl | n-Decyl | |
| 31 | 10 | 5 | 4-amyl | n-Dodecyl | |
| 32 | 10 | 5 | do | n-Tetradecyl | |
| 33 | 10 | 5 | 4-t-butyl-6-methyl | n-Dodecyl | |
| 34 | 13 | 5 | 4,6-diisobutyl | do | |
| 35 | 15 | 5 | 4,6-dipentyl | do | |
| 36 | 7 | 7 | | n-Octyl | |
| 37 | 7 | 7 | | n-Decyl | |
| 38 | 7 | 7 | | n-Dodecyl | |
| 39 | 7 | 7 | | n-Tetradecyl | |
| 40 | 5 | 5 | | n-Octyl | Quaternized as described in Example 2 with diethyl sulfate. |
| 41 | 5 | 5 | | n-Dodecyl | Dimethyl sulfate. |
| 42 | 5 | 5 | | do | n-Butyl bromide. |

In the following compounds, produced in the same manner as the compounds listed in Table I, R of the formula $R_1$—NH—$(CH_2)_y$—, the meaning of $y$ and $R_1$ being as given below in Table II.

TABLE II

| Ex. No. | n | z | Alkyl branching | y | $R_1$ | Salt |
|---|---|---|---|---|---|---|
| 43 | 3 | 3 | | 2 | β-(n-octylthio)-ethyl | |
| 44 | 3 | 3 | | 4 | p-Methyl-phenyl | |
| 45 | 3 | 3 | | 2 | Benzyl | |
| 46 | 3 | 3 | | 2 | 3'-methyl-cyclopentyl | |
| 47 | 3 | 3 | | 3 | $\Delta^{1,5}$-azacyclopentenyl-(5) | |
| 48 | 5 | 5 | | 5 | Hydrogen | |
| 49 | 5 | 5 | | 5 | do | Tartrate. |
| 50 | 5 | 5 | | 2 | β-(n-hexyloxy)-ethyl | |
| 51 | 5 | 5 | | 3 | Phenyl | |
| 52 | 5 | 5 | | 2 | p-Chloro-phenyl | |
| 53 | 5 | 5 | | 2 | β-(p-methyl-phenyl)-ethyl | |
| 54 | 5 | 5 | | 3 | m-Methoxy-benzyl | |
| 55 | 5 | 5 | | 3 | 2,4-dibromo-benzyl | |
| 56 | 5 | 5 | | 3 | 3'-methyl-$\Delta^{1',5'}$-azacyclopentenyl-(5') | |
| 57 | 5 | 5 | | 2 | n-Hexyl | |
| 58 | 5 | 5 | | 2 | n-Octyl | |
| 59 | 5 | 5 | | 3 | o-Chloro-phenyl | |
| 60 | 5 | 5 | | 3 | do | Acetate. |
| 61 | 5 | 5 | | 3 | m-Chloro-phenyl | Chloride. |
| 62 | 5 | 5 | | 4 | p-Chloro-phenyl | Benzoate. |
| 63 | 5 | 5 | | 6 | Methyl | |
| 64 | 5 | 5 | | 2 | n-Pentadecyl | |
| 65 | 9 | 5 | 4-isobutyl | 4 | Cycloheptyl | |
| 66 | 10 | 5 | 4-amyl | 2 | p-Bromophenyl | |
| 67 | 7 | 7 | | 2 | 6'-chloro-n-hexyl | |
| 68 | 7 | 7 | | 3 | o-Methoxy-phenyl | |
| 69 | 7 | 7 | | 3 | p-Chloro-benzyl | |
| 70 | 7 | 7 | | 2 | $\Delta^{1,9}$-azacyclononenyl-(9) | |
| 71 | 7 | 7 | | 3 | 5'-bromo-n-pentyl | |
| 72 | 7 | 7 | | 4 | 8'-ethyl-$\Delta^{1',9'}$-azacyclononenyl-(9'). | |
| 73 | 8 | 7 | 5-methyl | 2 | o-Methyl-benzyl | |

EXAMPLES 74 AND 75

The two following compounds are obtained in the same manner as described in Examples 1 and 2 from enanth lactam and capryl lactam by reaction with octylamine and chlorooctylamine

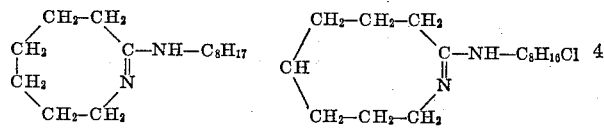

| Ex. No. | n | z | Alkyl branching | y | $R_1$ | Salt |
|---|---|---|---|---|---|---|
| 76 | 9 | 5 | 4-t-butyl | 2 | 4'-t-butyl-$\Delta^{1,7}$-azacycloheptenyl-(7). | |
| 77 | 5 | 5 | | 2 | $\Delta^{1,7}$-azacycloheptenyl-(7) | |

Further compounds produced in the same manner as those listed in Table I are given below in Table III.

TABLE III

| Ex. No. | n | z | Alkyl branching | R | Salt |
|---|---|---|---|---|---|
| 78 | 3 | 3 | | Benzyl | |
| 79 | 3 | 3 | | β-Phenyl-ethyl | |
| 80 | 3 | 3 | | 2'-methyl-cyclopentyl | |
| 81 | 5 | 5 | | α-Phenyl-γ-methyl-butyl | |
| 82 | 5 | 5 | | β-Phenyl-ethyl | |
| 83 | 5 | 5 | | do | Sulfate. |
| 84 | 5 | 5 | | β-(p-toluene)-ethyl | |
| 85 | 5 | 5 | | β-(p-methoxyphenyl)-ethyl | |
| 86 | 5 | 5 | | γ-(p-chlorophenyl)-propyl | Salicylate. |
| 87 | 5 | 5 | | δ-(p-bromophenyl)-butyl | |
| 88 | 5 | 5 | | β-(m-bromophenyl)ethyl | |
| 89 | 5 | 5 | | δ-(o-chloro-phenyl)-butyl | |
| 90 | 5 | 5 | | β-(3',5'-dichloro-phenyl)-ethyl | |
| 91 | 5 | 5 | | β-(2',4'-dimethoxy-phenyl)-ethyl | |
| 92 | 5 | 5 | | Benzylamino | |

The compounds of Structure I are suitable as active substances in fungicidal agents for the most various forms of application such as inhibition and repression of the growth of fungi on plants and parts thereof as well as the protection of organic materials of all types such as wood, textiles, furs, leather, paper, synthetic substances etc. from attack and decomposition by fungi. For these purposes the active substances are employed in a finely distributed form as such or combined with suitable carriers and distributing agents. They can also be used in combination with other fungicidally active substances as well as with fungistatica and bacteriostatica. To increase the range of action, also insecticidally or nematocidally active substances etc. can be added to the active substances used according to the invention.

To produce fungicidal agents according to the invention the active substances can be mixed, for example, with solid, pulverulent carriers such as, e.g., talcum, kaolin, loess, chalk or ground limestone. If desired, the pulverulent agents obtained can be made suspendable in water by the addition of suitable wetting and dispersing agents such as sulphite waste liquor. In addition, the active substances as such in solid, finely ground form, can be suspended in water with the aid of capillary active substances, or they can be emulsified in water, after dissolving them in organic solvents, with the aid of suitable emulsifying agents. Also, the active substances can be dissolved in organic solvents, e.g., in chlorinated hydrocarbons such as trichloroethylene, or in medium petroleum fractions, boiling range 100° to 200° possibly with the addition of auxiliary solvents such as acetone or higher ketones, e.g., cyclohexanone. Finally, the active substances can also be employed in the form of aerosols, smoke or mist, particularly in storerooms and greenhouses.

The fungicidal active substances are applied to an organic material to be protected generally either by admixture therewith, by spraying or by impregnating with organic-aqueous or aqueous solutions of the active substance which can contain the active substance in dispersion or suspension.

The following examples further illustrate the production of some fungicidal agents:

EXAMPLE I 20 parts of 4-tert.butyl-7-myristylamino-3,4,5,6-tetrahydro-2H-azepine produced as described in Example 28 are finely milled in a ball mill with 4 parts of a polyvinyl pyrrolidone dispersing agent and 76 parts of water. The paste so obtained is suspended in water and is used for the combatting of fungi, particularly in orchards.

EXAMPLE II 50 parts of 7-n-octylamino-3,4,5,6-tetrahydro-2H-azepine, produced as in Example 7, 2 parts of an adhesive having a polyvinyl alcohol base, 10 parts of sulphite waste liquor, 16 parts of champagne chalk, 20 parts of kaolin and 2 parts of a wetting agent having an alkyl and aryl sulphonate base are milled together, mixed, and again milled. A 50% wettable powder is obtained which can be suspended in water and is suitable in particular for use in fruit cultivation.

EXAMPLE III 10 parts 7-octylhydrazino-3,4,5,6-tetrahydro-2H-azepine, produced as described in Example 12 are dissolved in 80 parts of dimethyl formamide and 10 parts of an alkylaryl sulphonate are mixed into this solution until homogeneity is attained. In this way an emulsifiable solution is obtained which can be diluted to any concentration desired.

EXAMPLE IV 10 parts 9-n-dodecylamino-3,4,5,6,7,8-hexahydro-2H-azonine, produced as described in Example 38, are dissolved in 15 parts of dimethyl sulphoxides and 65 parts of cyclohexanone. 10 parts of an alkylaryl polyethylene oxide (ratio 1:10) are mixed into this solution until homogeneity is attained. An emulsifiable solution is obtained which can be diluted to any concentration desired.

EXAMPLE V

The fungicidal activity of the compounds of general Formula I was determined by the germination test with spores of the following types of fungi: *Alternaria tenuis*,

*Botrytis cinerea, Clasterosporium c., Coniothyrium dipl., Fusarium culm.,* Mucor spec., Penicillium spec., and *Stemphyllium cons.*

A determined amount of a 1%, 0.1% and 0.01% solution of active substances in acetone was placed—all under equal conditions—in four petri dishes of identical size. The solvent was evaporated whereupon a level coating of active substance ready for inoculation was obtained, in each of the four dishes. After inoculation, the dishes were kept for 168 hours at 20° C. in an atmosphere of 80% humidity. The germinated spores were then counted. The following table shows the values at which at least a 90% inhibition of germination was attained. The value "+" in the table represents at least a 90% inhibition of germination attained by the residue of one cc. of the aforesaid 1% solution of active substance in acetone (=13γ active substance per sq. cm.) "++" represents the same effect attained by the residue of one cc. of the aforesaid 0.1% solution, and "+++" the same effect attained with the residue of one cc. of 0.01% solution of active substance. "0" means no noticeable inhibition of germination when using the aforesaid 1% solution.

|  | Alt. ten. | Botr. cin. | Clast. c. | Coni dipl. | Fus. culm. | Muc. Spec. | Pen. Spec. | Stem. cons. |
|---|---|---|---|---|---|---|---|---|
| 7-methylamino-Δ¹,⁷-azacycloheptene Cefelin et al. Collection Czechoslov. Chem. Commun. 25,2522 (1960) | 0 | 0 | 0 | 0 | 0 | 0 | 0 | 0 |
| 7-n-dodecylamino-Δ¹,⁷-azacycloheptene [1] | + | ++ | +++ | +++ | ++ | +++ | ++ | + |
| 7-[β-(n-octylamino)-ethylamino]-Δ¹,⁷-azacycloheptene [2] | + | ++ | ++ | ++ | + | ++ | + | + |
| Quaternary 7-n-octylamino-Δ¹,⁷-azacycloheptene-dimethylsulfate [3] | ++ | ++ | +++ | ++ | ++ | +++ | ++ | ++ |

[1] Example 1.
[2] Example 58.
[3] Example 41.

I claim:
1. A method for controlling the growth of fungi comprising the application to a fungi-infested area, of a member selected from the group consisting of
   (a) a compound of the formula

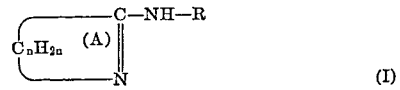

(I)

(b) a fungicidally effective salt of the compound of Formula I and an acid, and
   (c) a fungicidally effective guaternary salt thereof with an agriculturally acceptable quaternizing agent, in an amount of from about 1 to 20 kilograms per hectare of organic substrate;

R in Formula I being a member selected from the group consisting of
      alkyl with from 8 to 15 carbon atoms, alkoxy-alkyl with a total of from 4 to 20 carbon atoms, alkythio-alkyl with a total of from 4 to 20 carbon atoms, alkoxy-alkoxy-alkyl with a total of from 5 to 15 carbon atoms, alkoxy-alkoxy-alkoxy-alkyl with a total of from 7 to 15 carbon atoms,
      all alkyl and alkoxy portions except the terminal alkoxy and alkylthio groups of the last-mentione four members having at least 2 carbon atoms,
      bromoalkyl with from 4 to 15 carbon atoms, chloroalkyl with from 4 to 15 carbon atoms, alkylamino with from 1 to 15 carbon atoms, benzylamino, phenyl, lower alkyl-phenyl, lower alkoxy-phenyl, chloro-phenyl, bromo-phenyl, phenyl-lower alkyl, lower alkyl-phenyl-lower alkyl, lower alkoxy-phenyl-lower alkyl, chlorophenyl-lower alkyl, bromo-phenyl-lower alkyl, cycloalkyl with from 5 to 7 carbon atoms, lower alkyl-cycloalkyl with from 5 to 7 ring carbon atoms,
   and a radical of the formula

—(CH₂)ᵧ—NH—R₁ wherein
   R₁ is a member selected from the group consisting of 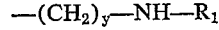
   hydrogen, alkyl with from 1 to 15 carbon atoms, alkoxy-alkyl with from 3 to 15 carbon atoms, alkylthioalkyl with from 3 to 15 carbon atoms, chloroalkyl with from 3 to 15 carbon atoms, bromoalkyl with from 3 to 15 carbon atoms,
   phenyl, lower alkyl-phenyl, lower alkoxy-phenyl, chlorophenyl, bromo-phenyl, phenyl-lower alkyl, lower alkyl-phenyl-lower alkyl, lower alkoxy-phenyl-lower alkyl, chlorophenyl-lower alkyl, bromophenyl-lower alkyl, cycloalkyl with from 5 to 7 carbon atoms, lower alkyl-cycloalkyl with from 5 to 7 ring carbon atoms, Δ¹,⁵-azacyclopentenyl-(5), lower alkyl-Δ¹,⁵-azacyclopentenyl-(5), Δ¹,⁷-azacycloheptenyl-(7), lower alkyl-Δ¹,⁷-azacycloheptenyl-(7), Δ¹,⁹-azacyclononenyl-(9) and lower alkyl-Δ¹,⁹-azacyclononenyl-(9);

y being an integer ranging from 2 to 6, and
   n being an integer ranging from 3 to 15, from 3 to not more than 7 of the carbon atoms of grouping $C_nH_{2n}$ being ring members of ring A.

2. A method as in claim 1, wherein said compound is 4-ter-butyl-7-decylamino-3,4,5,6-tetrahydro-2H-azepine.

3. A method as in claim 1, wherein R is alkyl of from 8 to 15 carbon atoms.

4. A method as in claim 1, wherein R is the grouping

—(CH₂)ᵧ—NH—R₁

5. Method of controlling the growth of fungi which comprises applying to a fungi-infested area 4-tertiary butyl-7-myristylamino-3,4,5,6-tetrahydro-2H-azepine in an amount of from about 1 to 20 kilograms per hectare.

6. Method of controlling the growth of fungi which comprises applying to a fungi-infested area 7-n-octyl-amino-3,4,5,6-tetrahydro-2H-azepine in an amount of from about 1 to 20 kilograms per hectare.

7. Method of controlling the growth of fungi which comprises applying to a fungi-ingested area 7-octylhydrazino-3,4,5,6-tetrahydro-2H-azepine in an amount of from about 1 to 20 kilograms per hectare.

8. Method of controlling the growth of fungi which comprises applying to a fungi-infested area 9-n-dodecyl-amino-3,4,5,6,7,8-hexahydro-2H-azonine in an amount of from about 1 to 20 kilograms per hectare.

9. A composition for controlling the growth of fungi, consisting essentially of a member selected from the group consisting of
   (a) a compound of the formula

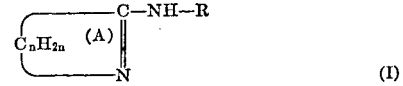

(I)

(b) a fungicidally effective salt of the compound of Formula I and an acid, and
   (c) a fungicidally effective quaternary salt thereof with an agriculturally acceptable quaternizing agent, in an amount of from about 1 to 20 kilograms per hectare of organic substrate;

R in Formula I being a member selected from the group consisting of
      alkyl with from 8 to 15 carbon atoms, alkoxy-alkyl with a total of from 4 to 20 carbon atoms, alkylthio-alkyl with a total of from 4 to 20 carbon atoms, alkoxy-alkoxy-alkyl with a total of from 5 to 15 carbon atoms, alkoxy-alkoxyalkoxy-alkyl with a total of from 7 to 15 carbon atoms, all alkyl and alkoxy portions except the terminal alkoxy and alkylthio groups of the last-mentioned four members having at least 2 carbon atoms, bromoalkyl with from 4 to 15 carbon atoms, chloroalkyl with from 4 to 15 carbon atoms, alkylamino with from 1 to 15 carbon atoms, benzylamino, phenyl, lower alkyl-phenyl, lower alkoxy-phenyl, chloro-phenyl, bromo-phenyl, phenyl-lower alkyl, lower alkyl-phenyl-lower alkyl, lower alkoxy-phenyl-lower alkyl, chlorophenyl-lower alkyl, bromo-phenyl-lower alkyl, cycloalkyl with from 5 to 7 carbon atoms, lower alkyl-cycloalkyl with from 5 to 7 ring carbon atoms, and a radical of the formula $$-(CH_2)_y-NH-R_1$$

wherein $R_1$ is a member selected from the grouping consisting of hydrogen, alkyl with from 1 to 15 carbon atoms, alkoxy-alkyl with from 3 to 15 carbon atoms, alkylthioalkyl with from 3 to 15 carbon atoms, chloroalkyl with from 3 to 15 carbon atoms, bromo-alkyl with from 3 to 15 carbon atoms, phenyl, lower alkyl-phenyl, lower alkoxy-phenyl, chloro-phenyl, bromo-phenyl, phenyl-lower alkyl, lower alkyl-phenyl-lower alkyl, lower alkoxy-phenyl-lower alkyl, chlorophenyl-lower alkyl, bromophenyl-lower alkyl, cycloalkyl with from 5 to 7 carbon atoms, lower alkyl-cycloalkyl with from 5 to 7 ring carbon atoms, $\Delta^{1,5}$-azacyclopentenyl-(5), lower alkyl-$\Delta^{1,5}$-azacyclopentenyl-(5), $\Delta^{1,7}$-azacycloheptenyl-(7), lower alkyl-$\Delta^{1,7}$-azacycloheptenyl-(7), $\Delta^{1,9}$-azacyclononeyl-(9) and lower alkyl-$\Delta^{1,9}$-azacyclononeyl-(9);

$y$ being an integer ranging from 2 to 6, and $n$ being an integer ranging from 3 to 15, and from 3 to not more than 7 of the carbon atoms of grouping $C_nH_{2n}$ being ring members of ring A, in an amount of from about 2 to 85% by weight, based on the total weight of the composition, the balance consisting of a carrier inert to said member and being a solid, pulverulent agriculturally acceptable carrier.

References Cited

Gehrke, Faserforsch. Textiltech, vol. 13, p. 95 (1962). 260–239B.

ALBERT T. MEYERS, *Primary Examiner.*

JULIAN S. LEVITT, SAM ROSEN, *Examiners.*

S. J. FRIEDMAN, *Assistant Examiner.*